US010167532B2

(12) United States Patent
Laucournet et al.

(10) Patent No.: US 10,167,532 B2
(45) Date of Patent: Jan. 1, 2019

(54) METHOD FOR ISOLATING RARE EARTHS AND/OR ADJACENT METAL ELEMENT(S) CONTAINED IN THE MAGNETIC PHASE OF PERMANENT MAGNETS

(71) Applicant: COMMISSARIAT A L'ENERGIE ATOMIQUE ET AUX ENERGIES ALTERNATIVES, Paris (FR)

(72) Inventors: Richard Laucournet, La Buisse (FR); Céline Lecorre, Longueval-Barbonval (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 618 days.

(21) Appl. No.: 14/438,506

(22) PCT Filed: Oct. 21, 2013

(86) PCT No.: PCT/IB2013/059502
§ 371 (c)(1),
(2) Date: Apr. 24, 2015

(87) PCT Pub. No.: WO2014/064597
PCT Pub. Date: May 1, 2014

(65) Prior Publication Data
US 2015/0292060 A1    Oct. 15, 2015

(30) Foreign Application Priority Data
Oct. 24, 2012   (FR) ...................... 12 60130

(51) Int. Cl.
*C22B 59/00* (2006.01)
*C22B 3/00* (2006.01)
(Continued)

(52) U.S. Cl.
CPC .......... *C22B 59/00* (2013.01); *C01F 17/0043* (2013.01); *C22B 3/00* (2013.01);
(Continued)

(58) Field of Classification Search
None
See application file for complete search history.

(56) References Cited

U.S. PATENT DOCUMENTS

| 5,362,459 A | 11/1994 | Greenberg |
| 5,961,938 A | 10/1999 | Yamamoto |
| 2012/0137829 A1* | 6/2012 | Harris ............... C22B 7/002 75/363 |

FOREIGN PATENT DOCUMENTS

| CN | 101817547 A | 9/2010 |
| EP | 0173588 A1 | 3/1986 |

(Continued)

OTHER PUBLICATIONS

Jun. 3, 2014 Search Report issued in International Patent Application No. PCT/IB2013/059502.

(Continued)

*Primary Examiner* — Melissa S Swain
(74) *Attorney, Agent, or Firm* — Oliff PLC

(57) ABSTRACT

A isolating method including: (i) arranging material forming a magnetic phase as a demagnetised powder, having an average particle size no larger than 700 μm without particles not making up the magnetic phase; (ii) dissolving the powder of step (i) in an acid medium with at least one oxidising agent in the presence of hydroxide ions, at a pH strictly lower than 7; (iii) precipitating the adjacent metal element(s) in the hydroxide state by adding to the solution obtained at the end of step (ii) an effective amount of hydroxylated base; (iv) isolating the metal hydroxide precipitate formed at the end of step (iii) and, when necessary, recovering same; (v) precipitating the rare earth elements in the oxalate state in the solution without adjacent metal element(s) and obtained at the end of step (iv); and (vi) recovering the rare earths in the precipitated state of rare earth oxalate.

23 Claims, 2 Drawing Sheets

Figure 1:
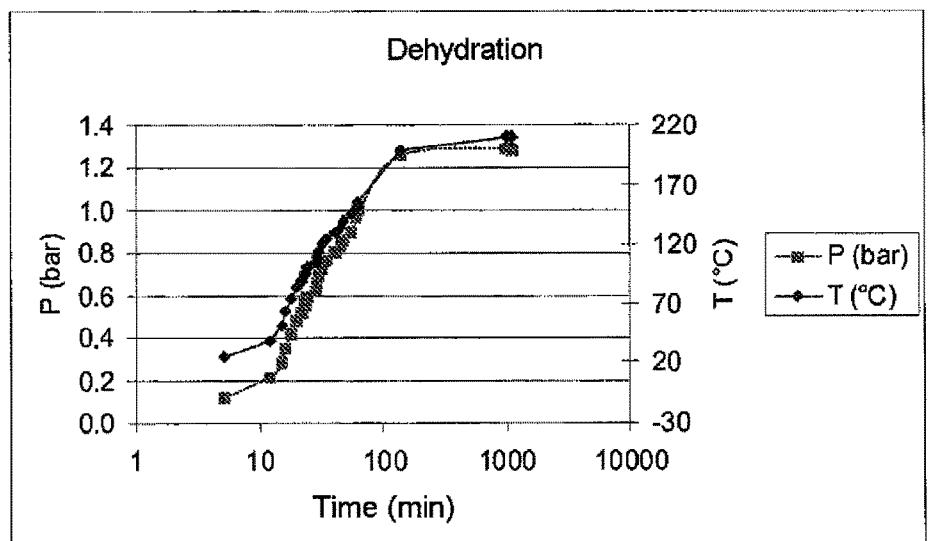

(51) Int. Cl.
     *C22B 7/00*          (2006.01)
     *C01F 17/00*        (2006.01)
     *H01F 41/02*       (2006.01)

(52) U.S. Cl.
     CPC .............. *C22B 7/006* (2013.01); *C22B 7/007* (2013.01); *H01F 41/0253* (2013.01); *Y02P 10/234* (2015.11)

(56) References Cited

FOREIGN PATENT DOCUMENTS

| | | |
|---|---|---|
| EP | 0538320 A1 | 4/1993 |
| EP | 0790321 B1 | 12/1999 |
| JP | H01-183415 A | 7/1989 |
| JP | 2001-335852 A | 12/2001 |
| JP | 2009-249674 A | 10/2009 |
| JP | 2009249674 A * | 10/2009 |
| JP | 2010-199110 A | 9/2010 |
| RU | 2097330 C1 | 11/1997 |
| RU | 2382735 C1 | 2/2010 |
| TW | 1295591 B | 4/2008 |
| WO | 92-00595 A1 | 1/1992 |
| WO | 96/00698 A1 | 1/1996 |
| WO | 2007/119846 A1 | 10/2007 |
| WO | 2009/119720 A1 | 10/2009 |

OTHER PUBLICATIONS

Jun. 3, 2014 Written Opinion issued in International Patent Application No. PCT/IB2013/059502.

* cited by examiner

METHOD FOR ISOLATING RARE EARTHS AND/OR ADJACENT METAL ELEMENT(S) CONTAINED IN THE MAGNETIC PHASE OF PERMANENT MAGNETS

The present invention relates to a novel process of use in recovering rare earth metals and/or ancillary metal element(s) present in the magnetic phase of magnets or derived products.

The process of the invention has a particularly advantageous application in the recycling of the rare earth metals (RE) present in magnets based on rare earth metals, such as, for example, spent permanent magnets, such as magnets of Neodymium-Iron-Boron (Nd—Fe—B) or Samarium-Cobalt (Sm—Co) type, and more broadly in the recycling of electronic and electrical waste comprising magnets of this type.

In fact, RE-based permanent magnets can comprise up to 35% by weight of rare earth metals. These magnetic products are used in various fields and in particular in wind turbine generators, electric motors and generators of some hybrid cars, some transducers of the membranes of top-of-the-range stereo headphones, and also in new generations of sound reinforcement speakers and of dynamic microphones, or also in hard disks in order to form the motor which ensures the positioning of the read/write heads, and the like.

For obvious reasons, the recovery of these rare earth metals from the spent magnets is of undeniable advantage, whether economically, from the viewpoint of the high cost of rare earth metals, or environmentally. This is because the extraction of rare earth metals from ores requires numerous hydrometallurgical stages for the concentration of the rare earth metals and their purification.

Numerous methods have already been provided for the recycling of rare earth metals present in magnetic or nonmagnetic waste products. A distinction may be made between these processes from the viewpoint of the extraction method which they favor, namely by direct chlorination or fluorination of the rare earth metals, by melting the rare earth metals, by extraction of the rare earth metals via a molten metal, such as aluminum or magnesium, or also by hydrometallurgical recycling.

However, for the reasons set out in detail below, these methods of recycling are not entirely satisfactory.

Thus, in the context of the recovery of rare earth metals by direct chlorination or fluorination, mention may be made, for example, of the document CN 101817547, which provides for the recovery of RE from a magnet via a process which consists in grinding the magnet, in adding carbon powder to the power obtained and in then bringing this mixture into contact with a stream of chlorine gas at 400-450° C. in order to produce RE chlorides and a volatile iron chloride. The RE are subsequently purified by oxalic acid precipitation. For its part, the application WO 2009/119720 describes a process for the recovery of rare earth metals by immersion of the alloy of rare earth metals in a halogenated molten salt at high temperature (1300-1800 K) which makes it possible to extract the RE in the form of gaseous RE halides. It is clear that these two techniques, which are based on a halogenation of the RE, are not very attractive due to the dangerousness of the circulation of chlorinated or fluorinated gas and the low solid-gas reaction kinetics.

By way of representation of the second method of recycling by melting, mention may be made in particular of the document JP 2001-335852. The process which is described therein is based on the mixing of powder formed of magnets and of a fluorinated agent, such as $NH_4F$. The combination is heated in a high temperature arc furnace until molten. After cooling, the RE in the form of a metal alloy are reencountered as a mixture with a slag and may be separated by difference in density. The application JP 2010-199110 also reports a recycling process of this type, applied to devices comprising RE-based magnets. This process consists in heating, below the melting point of the magnet, until the combination has partially melted. In a second stage, the molten fraction is separated from the remainder and then the nonmolten fraction is sieved in order to recover a fraction rich in alloy rich in neodymium. However, these two processes exhibit the major disadvantage of requiring a high energy cost in order to achieve the high treatment temperatures (>1000° C.). Additional to this high energy cost is the difficulty of separating a solid fraction from a liquid fraction.

As regards the third recycling method based on an extraction of the RE via a molten metal, it is especially illustrated by the methods provided in the application WO 2007/119846 and the paper by Okabe et al., Direct Extraction and Recovery of Neodymium Metal from Magnet Scrap, Materials Transactions, Vol. 44, No. 4, 2003, pp. 798-801.

The document WO 2007/119846 more particularly describes a process comprising oxidation of the magnet by heat treatment, followed by bringing it into contact with aluminum or an aluminum alloy, in order to initiate an aluminothermic reaction resulting in an RE oxide as a mixture with a slag and an iron-boron alloy, which have to be separated subsequently. In this case, the difficulty of the use of this method lies in the control of the aluminothermic reaction, which is problematic, and risks of runaway and of explosiveness of the mixture due in particular to the strong release of energy. Furthermore, it is not easy to separate the three fractions obtained, RE oxide, slag and Fe—B alloy.

With regard to the process described in the abovementioned paper, it for its part takes advantage of the strong affinity of molten magnesium for neodymium, in contrast to iron. The magnet is ground and then placed in the upper part of a sealed reactor. Magnesium metal is placed in the lower part of the reactor. The magnesium evaporates at 1090° C. and comes into contact with the magnet powder. The neodymium melts and forms an alloy with the magnesium, while leaving the iron in the solid state. By cooling in the top of the plant, the magnesium laden with neodymium condenses and folds back into the lower crucible, where it passes back into the gas state. The neodymium metal is recovered, in a second stage, by vacuum evaporation of the magnesium at 850-1040° C. However, for this process, the limits are the control of a metal in the gas state, the need to separate the magnesium from the rare earth metals by distillation and also the energy costs required for the two combined thermal stages of the process.

As regards the fourth method of recovery, based on a hydrometallurgical recycling, it is described in detail more particularly in the following documents.

Thus, the patent U.S. Pat. No. 5,362,459 describes a process which consists in dissolving a slag originating from the preparation of NdFeB alloy by electrolysis in a 150 g/l sulfamic acid ($NH_2SO_3H$) bath. During the electrolysis, the iron is deposited at the cathode. Once dissolved, the bath laden with neodymium ion is mixed with hydrofluoric acid in order to precipitate neodymium fluoride. Unfortunately, this method of recovery is not suitable for bulk magnets and is particularly expensive in energy. Furthermore, this same document describes a process for the treatment of the chips from the machining of magnets of NdFeB type comprising a stage of oxidation by sodium hydroxide solution, a selective dissolution of the oxidized magnet by acetic acid, in order to produce neodymium acetate, and then a fluorination of this acetate by evaporation to give fluoride with HF. In this alternative form, the main limit is the very moderate oxidation of the magnet by the sodium hydroxide solution, and also the low solubility of the RE in acetic acid, which admittedly exhibits a degree of selectivity but which is too slow to envisage treating large volumes of magnets.

The document WO 96/00698 provides an alternative to the process described in document U.S. Pat. No. 5,362,459 by carrying out the oxidation of the magnet by a heat treatment and a distribution of the oxide powder by HCl. The Fe—Nd separation takes place by oxalic acid precipitation of the Nd oxalate, which exhibits a much lower solubility than iron oxalate. For this recycling method, a thermal oxidation treatment is required and thus represents a not insignificant cost.

The document RU 2382735 for its part provides a process for the recovery of RE based on the dissolution of the magnets by a mixture of tributyl phosphate and tetrachloroethylene saturated with chloride. An aqueous solution of alkali metal fluoride is prepared and is added to the organic solution in order to precipitate an RE fluoride. However, the use of tetrachloroethylene is banned today.

Furthermore, the application TW 200742621 describes a process based on a demagnetization of the magnets at 350° C., their grinding (<50 mesh–300 µm) and their immersion in concentrated (3N) sulfuric acid for the purpose of impregnating the magnet with the acid. The latter operation is assisted by the application of ultrasound, making possible the dissolution of the neodymium, iron and boron. A first precipitation is then carried out in order to recover a neodymium hydroxide. A second precipitation is then carried out in order to obtain an iron hydroxide. In this process, however, several limits are to be emphasized. First of all, the difficulty in grinding the magnets in order to achieve the particle size distribution mentioned (50 mesh), in particular in the presence of the corrosion-resistant metal coating which generally covers the magnets, then the difficulty in carrying out the dissolution and, finally, the recovery of the Nd in the hydroxide form, which generally results in a degraded purity of the product due to the entrainment of contaminants (Fe and B) during the precipitation of this gel.

Finally, the document RU 2097330 provides a process based on a heat treatment of the magnet of between 80 and 700° C., followed by dissolution with nitric acid. The nitric acid solution, comprising the elements Fe, B and Nd, is subsequently brought into contact with an organic solution comprising tributyl phenyl (TBP), an extractant known in solvent extraction. After a series of extraction stages, the neodymium may be recovered in the form of a nitrate solution. In this route, the organic solution is generally composed of a solvent based on benzene or toluene, these two solvents being regarded as toxic. Furthermore, this process exhibits the disadvantage of requiring numerous successive extraction stages in order to separate the elements from one another.

Consequently, from the viewpoint of the above, it is apparent that the techniques for recycling rare earth metals currently available are not entirely satisfactory, insofar as they prove, for some, to be prohibitive in terms of cost, not in accordance with the requirements of public health or of environmental standards, in particular from the viewpoint of the toxic nature of some reactants which they require, or also not transferable to the industrial scale.

The present invention is targeted specifically at providing a novel process which makes it possible to overcome, at least in part, the abovementioned disadvantages.

Thus, the present invention relates to a process of use in isolating rare earth metals and/or ancillary metal element(s) distinct from rare earth metals present in the magnetic phase of magnets or derived products, comprising at least the stages consisting in:

(i) having the material forming said magnetic phase available in the form of a demagnetized powder, with a mean particle size of less than or equal to 700 µm, devoid of contamination with nonconstituent particles of said magnetic phase;

(ii) dissolving said powder from stage (i) in an acid medium supplemented with at least one oxidizing agent capable of adjusting the ancillary metal element(s) to an oxidation state compatible with their consecutive precipitation in stage (iii), in the presence of hydroxide ions, at a pH strictly of less than 7;

(iii) precipitating the ancillary metal element(s) in the hydroxide state via the addition, to said solution obtained on conclusion of stage (ii), of an effective amount of at least one hydroxylated base, under pH conditions favorable to the maintenance of the rare earth metal elements in the dissolved form;

(iv) isolating the metal hydroxide precipitate formed on conclusion of stage (iii) and, if appropriate, recovering it;

(v) precipitating the rare earth metal elements in the oxalate state from the solution depleted in, indeed even devoid of, ancillary metal element(s) and obtained on conclusion of stage (iv) via the addition, to said solution, of an effective amount of oxalic acid; and (vi) recovering said rare earth metals in the form of a precipitate of rare earth metal oxalate.

In the continuation of the text, "metal element(s)" will more simply denote the metal element(s) (for example, iron, cobalt, zirconium) distinct from the rare earth metal elements and which are present, in conjunction with the rare earth metals, in the magnetic material to be treated.

Depending on the magnetic material to be treated, a single metal element or a mixture of several metal elements may be involved.

In addition, "magnetic material" or also "material to be treated" will be used to denote the material forming said magnetic phase of the magnet or derived product and which comprises the rare earth metals and the ancillary metal element(s).

"Rare earth metals" is intended to denote all of the rare earth metals present in the magnetic material. Generally, a mixture of rare earth metals is involved. For example, the normal name "Neodymium-Iron-Boron" in fact implies a mixture of neodymium and praseodymium, and also of other rare earth metals added as additives which make it possible to improve the magnetic properties, such as europium or dysprosium.

"Magnets or derived products" is intended to denote, generally, magnets based on rare earth metals, in particular permanent magnets, especially of Neodymium-Iron-Boron or Samarium-Cobalt type, but also any product comprising a magnetic phase including rare earth metals and ancillary metal element(s), such as scrap, of powders, chips or bulk components type, resulting from the process for the manufacture of the magnets, for example originating from the machining or shaping operations.

The process of the invention is just as well suited to the treatment of spent magnets originating from waste electrical and electronic equipment (WEEE), scrap from the production of permanent magnets (chips, bulk components) or also spent magnets which can originate from electric motors or other industrial motors.

According to a specific embodiment, the process of the invention is employed for isolating rare earth metals and/or iron, in particular neodymium and/or iron, present, for example, in the magnetic phase of magnets of Neodymium-Iron-Boron type.

According to another specific embodiment, the process of the invention is employed for isolating rare earth metals and/or cobalt, in particular samarium and/or cobalt, present, for example, in the magnetic phase of magnets of Samarium-Cobalt type.

As expanded upon in the continuation of the text, the magnetic material powder may easily be obtained from the magnetic product, optionally coated with its protective coating, via a process employing a hydridation/dehydridation treatment.

In addition, the process of the invention proves to be particularly advantageous on several accounts.

First of all, as illustrated in the example which follows, it makes it possible to recover all of the rare earth metals present in the magnetic phase of a magnet, with a high recovery yield, in particular of greater than 95%.

In addition, advantageously, the use according to the process of the invention of a stage of dissolution of the magnetic material powder in an oxidizing acid medium ($H_2O_2$, NaS, bleach) makes it possible to avoid an expensive and less effective oxidation heat treatment.

Furthermore, the inventors have discovered that the separation, beforehand, of the metal element(s) by hydroxide precipitation advantageously makes it possible to limit the addition of oxalic acid, in order to recover the rare earth metals, and increase the recovery yield.

In addition, the oxalic acid precipitation according to the process of the invention makes it possible to recover rare earth metals with a high purity, in particular of greater than 99% and especially of greater than that obtained by methods for the precipitation of rare earth metals in the hydroxide form.

Thus, according to another of its aspects, the present invention is targeted at the use of a process as defined above for the recycling of rare earth metals present in magnets or derived products.

What is more, the process of the invention makes it possible not only to isolate rare earth metals but also to recover ancillary metal elements present in the magnetic material, with high yields, in particular of approximately 100%. These metal elements can thus be recovered in value in various industries (pigments, the iron and steel industry, and the like).

Other characteristics, alternative forms and advantages of the process according to the invention will more clearly emerge on reading the description, examples and figures which will follow, given by way of illustration and without limitation of the invention.

In the continuation of the text, the expressions "of between . . . and . . . ", "ranging from . . . to . . . " and "varying from . . . to . . . " are equivalent and are intended to mean that the limits are inclusive, unless otherwise mentioned.

Unless otherwise indicated, the expression "comprising a" should be understood as "comprising at least one".

Magnetic Material Powder

As mentioned above, a first stage of the process of the invention consists in having available the material including rare earth metals and ancillary metal elements) in the form of a powder with a mean particle size of less than or equal to 700 µm.

Preferably, said powder exhibits a mean particle size of less than or equal to 500 µm, in particular ranging from 10 to 500 µm, especially of less than or equal to 200 µm, more particularly of less than 100 µm, in particular of less than 50 µm. According to a specific embodiment, said powder has a particle size of approximately 30 µm.

The particle size can be measured, for example, by laser particle size or by sieving according to a technique known to a person skilled in the art.

This powder is demagnetized and devoid of contamination with nonconstituent particles of said magnetic phase, such as, for example, resulting from the protective coating of the magnet.

The powder of stage (i) may be obtained from a magnetic material in the bulk form via a hydridation-dehydridation treatment.

The hydridation-dehydridation treatment advantageously makes it possible to result in a very fine powder, in particular with a mean particle size of less than or equal to 700 µm, in particular of less than or equal to 500 µm.

Generally, magnetic products exhibit a protective coating of metal alloy type positioned at the surface of the magnetic material, such as, for example, a coating composed of nickel, copper or other alloys for protecting from oxidation.

As expanded upon below, the inventors have discovered that it is possible to easily isolate the magnetic material in the form of a fine powder from its protective coating by employing a hydridation-dehydridation treatment.

More particularly, the magnetic material powder in stage (i) may be prepared according to a process comprising at least the stages consisting in:

(a) having available magnetic product formed of the magnetic material in the bulk form and, if appropriate, of a protective coating of metal alloy type positioned at the surface of said magnetic material;

(b) if necessary, demagnetizing the material to be treated;

(c) if existing, cracking said protective coating;

(d) promoting the fragmentation of said magnetic material in the form of particles with a mean size of less than or equal to 700 µm, in particular of less than or equal to 500 µm, by exposure to a hydridation-dehydridation treatment; and (e) recovering the powder formed of the particles deriving from the fragmentation of the magnetic material, in a form isolated from the fragments of the protective coating.

The demagnetization of stage (b) is preferably carried out via a heat treatment at a temperature of less than 350° C., in particular at a temperature ranging from 80 to 250° C. This is because the magnetization may decrease very rapidly by heating far below the Curie temperature, which lies, for example, for the "NdFeB" magnets, in the vicinity of 280° C. This demagnetization is desirable in order to simplify the handling of the magnetic product.

The protective coating may be cracked in stage (c) by simple mechanical shredding of the product demagnetized beforehand, for example by fracturing the magnet using a hammer mill. This stage is targeted at opening the protective coating, for the purposes of allowing the hydrogen, employed during the hydridation-dehydridation treatment, to access the magnetic material.

It is up to a person skilled in the art to carry out the hydridation-dehydridation treatment in stage (d) under conditions which favor the fragmentation of the magnetic material in the form of a fine powder.

Such a hydridation-dehydridation treatment is known to a person skilled in the art and has already been provided for the purposes of producing materials having a high magnetic property, in the powder form, for example in the documents EP 0 173 588 and EP 0 538 320.

This hydridation-dehydridation treatment does not affect the protective coating of metal alloy type.

Generally, the hydridation-dehydridation treatment is carried out within a sealed reactor and consists, in a first step, in bringing the magnetic material into contact with hydrogen (hydridation stage) by injecting hydrogen at ambient temperature into the reactor. Without wishing to be committed to a theory, the magnetic phase, on contact with the hydrogen, will undergo a swelling resulting in the weakening of the bulk magnetic material.

In a second step, the hydrogen of the reactor is withdrawn and may advantageously be recycled. A heat treatment of the material, for example in the vicinity of 200° C., makes it possible to dehydride the phase hydrided beforehand. The hydrogen given off in the latter stage may then be captured and also recycled.

By way of example, for a magnetic material of rare earth metals-Iron-Boron type, the two successive hydridation and dehydridation stages may be represented by the following schematic reactions:

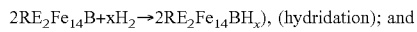

$2RE_2Fe_{14}B + xH_2 \rightarrow 2RE_2Fe_{14}BH_x$, (hydridation); and

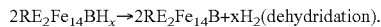

$2RE_2Fe_{14}BH_x \rightarrow 2RE_2Fe_{14}B + xH_2$ (dehydridation).

In the case of a magnetic product exhibiting a protective coating, the fine powder of magnetic material obtained on conclusion of the hydridation-dehydridation treatment may be easily isolated in stage (e) from the fragments of greater size deriving from the protective coating.

This separation may be carried out by simple sieving, for example using a vibrating sieve with a pore size of 2 mm. The metal alloy making up the coating is recovered on conclusion of the sieving and may be easily recycled in industries provided for this purpose.

Finally, this method for the preparation of the magnetic material powder advantageously makes it possible to isolate the magnetic material from its coating with a high yield, in particular of greater than 95%.

In addition, this method does not require a chemical treatment in order to strip the coating and consequently does not bring about contamination of the solution prepared in stage (ii) by the elements of the coating (such as Ni, Cu, Cr).

Such a treatment results in a very fine powder, in particular with a particle size of less than 700 μm, in particular of less than 500 μm, which does not require an additional mechanical treatment before it is employed in the process of the invention.

Dissolution of the Powder in an Oxidizing Acid Medium

In a second stage of the process of the invention, the powder from stage (i) is dissolved in an acid medium supplemented with at least one oxidizing agent capable of adjusting the ancillary metal element(s) to an oxidation state compatible with their consecutive precipitation in stage (iii), in the presence of hydroxide ions, at a pH strictly of less than 7.

Preferably, the magnetic material powder is introduced into said oxidizing acid medium in a proportion of from 1 to 20% by weight.

The acid medium may comprise one or more acids preferably chosen from hydrochloric acid, sulfuric acid and their mixture, in particular at a concentration of between 0.1 and 5 mol/l, more particularly between 0.5 and 2 mol/l.

The oxidizing acid medium may be prepared beforehand by addition of one or more appropriate oxidizing agents to an acid solution.

Particularly advantageously, the inventors have discovered that the addition of an oxidizing agent, even in a low concentration, to the acid medium makes possible efficient dissolution of the magnetic material, without requiring thermal oxidation.

According to a specific embodiment, said oxidizing acid medium is stirred using a stirring system, such as, for example, by magnetic stirring, stirring by vibrating table, and the like. Such a stirring makes it possible to accelerate the dissolution of the magnetic material powder in said oxidizing acid medium.

It is up to a person skilled in the art to adapt the composition of the oxidizing acid medium, in particular from the viewpoint of the nature and the amount of magnetic material powder to be dissolved.

Said oxidizing agent(s) may be chosen from $H_2O_2$, NaS and NaClO (bleach), and their mixtures.

Said oxidizing agent(s) may be employed in a content of less than or equal to 5% by volume, in particular from 0.5 to 5% by volume, preferably of the order of 1% by volume, with respect to the total volume of said acid medium.

The oxidizing agent employed according to the invention is chosen so as to make it possible to bring the ancillary metal element(s) to an oxidation state (also known as "degree of oxidation") such that said metal element(s) in this oxidation state is (are) capable of precipitating in the presence of hydroxide ions at a pH strictly of less than 7, preferably of less than 5, preferably of less than or equal to 3.

The pH values for precipitation of the various oxidation states for a given metal element are known to a person skilled in the art or may be easily deduced from precipitation tests in the presence of hydroxide ions.

The choice of the oxidizing agent from the viewpoint of the nature of the metal element and more particularly of the oxidation state desired comes within the general knowledge of a person skilled in the art.

According to a specific embodiment, in the case of the use of the process of the invention to isolate rare earth metals from iron, the oxidizing agent is chosen so as to make possible the oxidation of the iron to give iron(III).

The oxidizing agent may, for example, be $H_2O_2$.

By way of example, a Neodymium-Iron powder may be dissolved in a 2N hydrochloric acid solution supplemented with 1% by volume of $H_2O_2$.

According to another specific embodiment, in the case of the use of the process of the invention to isolate rare earth metals from cobalt, the oxidizing agent is chosen so as to make possible the oxidation of the cobalt to give cobalt(III).

The oxidizing agent may, for example, be bleach (NaClO).

Precipitation of the Ancillary Metal Element(s)

According to a third stage (iii) of the process of the invention, an effective amount of hydroxylated base is added to the solution obtained on conclusion of stage (ii) in order to precipitate said ancillary metal element(s) in the hydroxide state, under pH conditions favorable to the maintenance of the rare earth metals in the dissolved form.

The hydroxylated base added may, for example, be chosen from NaOH, $NH_4OH$, KOH and other hydroxylated organic bases.

"Effective amount" is understood to mean a minimum amount necessary for the expected effect to be obtained, in other words, in the present case, an amount sufficient to bring about the precipitation of the ancillary metal element(s) in the hydroxide state, without affecting the solubility of the rare earth metal elements.

It is up to a person skilled in the art to adjust this amount from the viewpoint of the pH desired in order to precipitate the metal element(s) in the hydroxide form, without precipitating the rare earth metals.

Preferably, on conclusion of stage (iii), more than 90% of the total amount of the rare earth metals remain in solution, preferably at least 95%.

The pH of the solution in stage (iii) is more particularly adjusted to a value strictly of less than 7, in particular ranging from 0.8 to 7, preferably of less than 5 and more preferably of less than or equal to 3.

According to a specific embodiment, in the case of the use of the process of the invention to isolate rare earth metals from iron, the pH of the solution in stage (iii), for the precipitation of the iron, is preferably adjusted to a value of approximately 2.5.

According to another specific embodiment, in the case of the use of the process of the invention to isolate rare earth metals from cobalt, the pH of the solution in stage (iii), for the precipitation of the cobalt, is advantageously adjusted to a value of approximately 3.

In a stage (iv) of the process of the invention, the metal hydroxide precipitate formed on conclusion of stage (iii) is isolated from the remainder of the solution, for example by filtration.

The metal hydroxide precipitate may thus be recovered in order to be recycled in various industries (pigments, the iron and steel industry, and the like).

The solution resulting from the removal of the metal hydroxide precipitate, which solution is obtained on conclusion of stage (iv), is thus a solution depleted in ancillary metal element(s) and preferably is completely devoid thereof.

According to a specific embodiment, the process of the invention additionally comprises, prior to the following stage (v), one or more stage(s) of washing, in particular with water, the metal hydroxide precipitate isolated in stage (iv) and of incorporation of the aqueous washing liquors in the solution depleted in, indeed even devoid of, ancillary metal element(s) obtained on conclusion of stage (iv).

This stage makes it possible to recover the small amount of rare earth metals which might have been entrained with the precipitation of the metal hydroxide in stage (iii).

Precipitation of the Rare Earth Metal Elements

According to a stage (v) of the process of the invention, an effective amount of oxalic acid is added to the solution depleted in, indeed even devoid of, ancillary metal element(s) in order to precipitate the rare earth metal elements in the oxalate state.

Just as above, "effective amount" is understood to mean a minimum amount necessary for the expected effect to be obtained, in other words, in the present case, an amount sufficient to bring about the precipitation of all of the rare earth metals in the oxalate state.

The adjustment of this amount comes within the competence of a person skilled in the art, in particular from the viewpoint of the amount of rare earth metals to be recovered in the solution obtained on conclusion of stage (iv).

Nevertheless, generally, the oxalic acid is added in a content of less than or equal to 10 mol/l, in particular in a proportion of from 0.01 to 5 mol/l.

The amount of oxalic acid is such that it thus makes it possible to bring about the reaction represented schematically below:

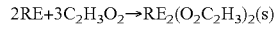

The invention will now be described by means of the following examples and figures, given by way of illustration and not of limitation of the invention.

FIGURES

Figure 2:
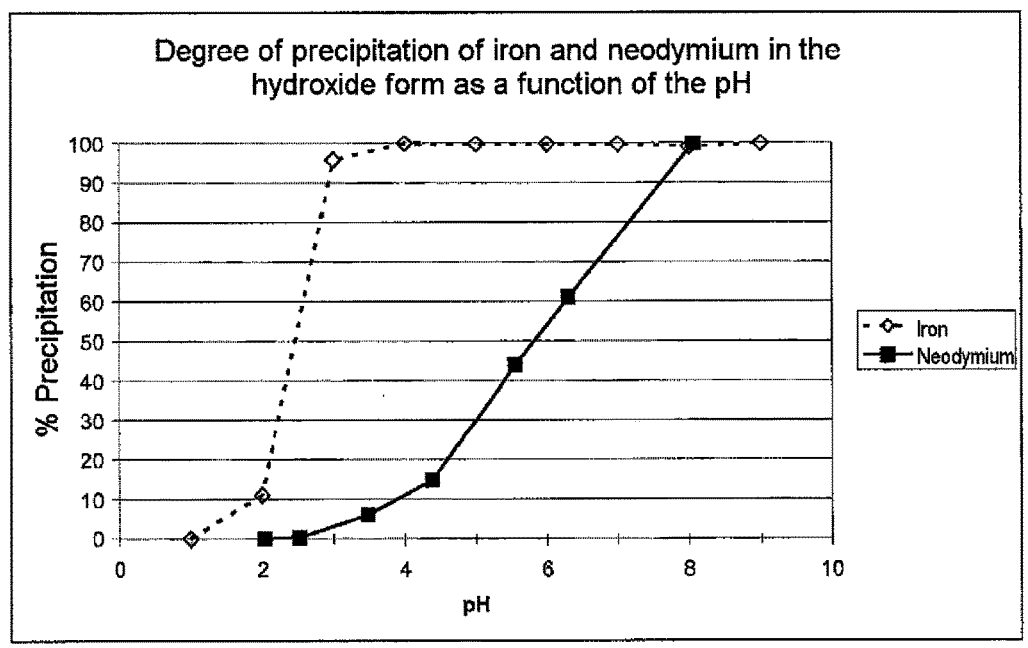
Figure 3:
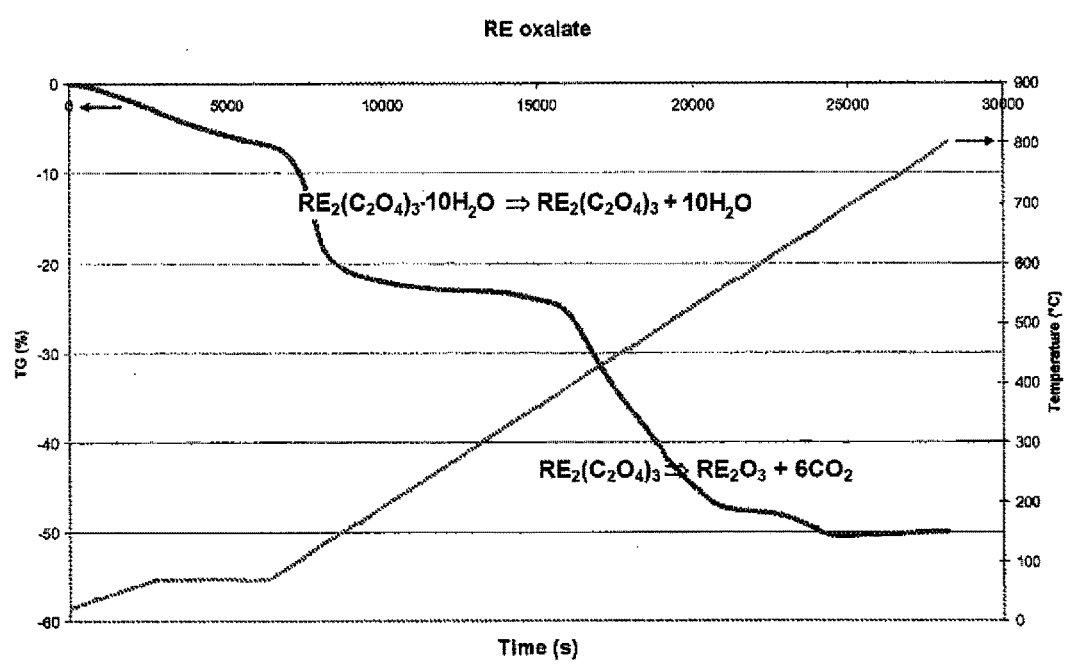

FIG. 1: graphic representation of the variations in temperature and in pressure during the dehydridation stage of the hydridation-dehydridation treatment carried out in example 1;

FIG. 2: graphic representation of the variations in the degrees of precipitation of iron(III) (-◊-) and neodymium (-■-) in the hydroxide form as a function of the pH; and FIG. 3: thermogravimetric analysis of the product (neodymium oxalate) obtained according to the process of the invention in example 1.

EXAMPLE 1

Magnetic Material Powder

A spent magnet of Nd—Fe—B type weighing 6 g is brought to 80° C. for 5 hours in an oven placed at 200° C. Following this treatment, its magnetization has considerably decreased and it may be easily handled.

The magnet is subsequently fractured using a hammer mill. This operation makes it possible to open the coating in order to access the core of the magnet.

Hydridation-dehydridation Treatment

The combination is placed in a sealed container which makes it possible to be fed with molecular hydrogen. After a low vacuum, the hydrogen is sent into the container. Contact with the magnet produces hydridation of the main phase of the magnet. This reaction is exothermic. Consequently, feeding of $H_2$ is gradual in order not to exceed 40° C.

Once the complete reaction has been carried out, the temperature naturally returns to ambient temperature. A low vacuum is then produced before the dehydridation. The latter is carried out by a gradual rise in the temperature up to 200° C. With the increase in the temperature, the hydrogen is released, as is testified thereto by FIG. 1.

On conclusion of the dehydridation, the magnetic material powder is recovered using a vibrating sieve with a pore size of 700 µm. The powder obtained exhibits a mean particle size (d50), measured by laser particle sizing, of 50 µm.

390 mg of coating are recovered.

Dissolution of the powder in an oxidizing acid medium

The powder collected (5.61 g) is dissolved in 50 ml of 2N HCl comprising 1 vol % of $H_2O_2$. After stirring for 2 hours, the combination is dissolved.

Precipitation of the element iron in the hydroxide state

Sodium hydroxide solution (2N) is gradually added up to pH=2.5.

This is because, as illustrated in FIG. 2, such a pH makes it possible to ensure the precipitation of iron(III) hydroxide without affecting the solubilization of the rare earth metals. Below pH 2.5, the amount of iron in solution is too high; above pH 2.5, the neodymium precipitates and there is a risk of the final yield being reduced.

From the first drops, a precipitate is observed. This precipitate is subsequently recovered by filtration, washed and dried at 100° C. The weight of iron recovered is 6.9 g. The chemical analysis carried out on this compound indeed confirms an iron(III) hydroxide. The weight obtained represents 94.5% of the iron initially present in the magnet.

Precipitation of the RE Metal Elements

Subsequently, a 1 mol/l oxalic acid solution is gradually run into the remaining solution. A precipitate is then observed.

After filtration and drying at 60° C., a weight of 8.7 g is recovered. A thermogravimetric analysis (FIG. 3) confirms the hydration of the compound by 10 mol of water typical of rare earth metal oxalates. The yield for recovery of the rare earth metals in the oxalate form is estimated at 90.7%.

The invention claimed is:

1. A process for isolating rare earth metals and ancillary metal element(s) distinct from rare earth metals present in a magnetic phase of magnets or derived products, comprising:
   (i) having a material forming said magnetic phase available in the form of a demagnetized powder, with a mean particle size of less than or equal to 700 μm, devoid of contamination with nonconstituent particles of said magnetic phase;
   (ii) dissolving said powder from stage (i) in an acid medium comprising a first quantity of acid and supplemented with at least one oxidizing agent capable of adjusting the ancillary metal element(s) to an oxidation state compatible with their consecutive precipitation in stage (iii), in the presence of hydroxide ions, at a pH strictly of less than 7, to form a first solution;
   (iii) precipitating the ancillary metal element(s) in the hydroxide state to form a metal hydroxide precipitate by adding at least one hydroxylated base to the first solution obtained on conclusion of stage (ii), under pH conditions such that the rare earth metals are in a dissolved form;
   (iv) isolating the metal hydroxide precipitate formed on conclusion of stage (iii), and optionally recovering it, leaving a second solution that is depleted in, and optionally devoid of, ancillary metal element(s);
   (v) precipitating the rare earth metals in an oxalate state from the second solution obtained on conclusion of stage (iv) by adding a second quantity of acid comprising an oxalic acid to said second solution; and
   (vi) recovering said rare earth metals in a form of a precipitate of rare earth metal oxalate,
   wherein the process does not include an oxidation heat treatment step.

2. The process as claimed in claim 1, in which the powder in stage (i) has a mean particle size ranging from 10 to 500 μm.

3. The process as claimed in claim 1, in which said oxidizing acid medium of stage (ii) comprises one or more acids selected from the group consisting of hydrochloric acid, sulfuric acid, and their mixture.

4. The process as claimed in claim 1, in which said oxidizing agent is selected from the group consisting of $H_2O_2$, NaS, NaClO, and their mixtures.

5. The process as claimed in claim 1, in which said hydroxylated base added in stage (iii) is selected from the group consisting of NaOH, $NH_4OH$, KOH, and other hydroxylated organic bases.

6. The process as claimed in claim 1, in which the pH of the solution is adjusted in stage (iii) to a value strictly of less than 7.

7. The process as claimed in claim 1, for isolating rare earth metals and/or iron.

8. The process as claimed in claim 7, in which the acid medium in stage (ii) is supplemented with at least one oxidizing agent capable of oxidizing iron in a form of iron(III).

9. The process as claimed in claim 1, for isolating rare earth metals and/or cobalt.

10. The process as claimed in claim 9, in which the acid medium in stage (ii) is supplemented with at least one oxidizing agent capable of oxidizing cobalt in a form of cobalt(III).

11. The process as claimed in claim 1, further comprising, prior to stage (v), one or more stage(s) of washing the metal hydroxide precipitate isolated in stage (iv) and incorporating aqueous wash liquors from the washing into the second obtained on conclusion of stage (iv).

12. The process as claimed in claim 1, in which the powder of stage (i) is obtained from a magnetic material in bulk form via a hydridation-dehydridation treatment.

13. The process as claimed in claim 1, in which the powder in stage (i) is formed from a magnetic product via at least the stages comprising:
   (a) having available a magnetic product formed of magnetic material in bulk form and, optionally, a protective coating of metal alloy positioned at a surface of said magnetic material;
   (b) demagnetizing the magnetic product to be treated if it is magnetized;
   (c) if existing, cracking said protective coating,
   (d) fragmenting said magnetic material to form a powder of particles with a mean size of less than or equal to 700 μm by exposure to a hydridation-dehydridation treatment; and
   (e) recovering the powder, in a form isolated from remnants of the protective coating.

14. A process for the recycling of rare earth metals present in magnets or derived products, comprising isolating rare earth metals from magnets or derived products by the process of claim 1.

15. The process as claimed in claim 1, in which the powder in stage (i) has a mean particle size less than or equal to 200 μm.

16. The process as claimed in claim 1, in which the pH of the solution is adjusted in stage (iii) to a value ranging from 0.8 to strictly less than 7.

17. The process as claimed in claim 1, for isolating neodymium and/or iron present in the magnetic phase of a magnet of Neodymium-Iron-Boron type.

18. The process as claimed in claim 7, in which the at least one oxidizing agent in stage (ii) comprises $H_2O_2$.

19. The process as claimed in claim 1, for isolating samarium and/or cobalt present in the magnetic phase of a magnet of Samarium-Cobalt type.

20. The process as claimed in claim 9, in which the at least one oxidizing agent in stage (ii) comprises NaClO.

21. The process as claimed in claim 13, in which step (b) is performed by exposure to a heat treatment at a temperature of less than 350° C.

22. The process as claimed in claim 13, in which step (c) is performed by mechanical shredding of the magnetic product.

23. The process as claimed in claim 13, in which step (e) is performed by sieving.

* * * * *